US010038933B2

(12) United States Patent
Otsuka et al.

(10) Patent No.: US 10,038,933 B2
(45) Date of Patent: Jul. 31, 2018

(54) INFORMATION PROVIDING SYSTEM AND INFORMATION PROVIDING METHOD, CONTENT RECORDING APPARATUS AND CONTENT RECORDING METHOD, AND COMPUTER PROGRAM

(75) Inventors: Satoshi Otsuka, Kanagawa (JP); Katsuro Matsuzaki, Kanagawa (JP); Yasushi Tsuruta, Tokyo (JP); Kumiko Tokita, Chiba (JP)

(73) Assignee: Saturn Licensing LLC, New York, NY (US)

( * ) Notice: Subject to any disclaimer, the term of this patent is extended or adjusted under 35 U.S.C. 154(b) by 1671 days.

(21) Appl. No.: 10/951,649

(22) Filed: Sep. 29, 2004

(65) Prior Publication Data
US 2005/0132411 A1  Jun. 16, 2005

(30) Foreign Application Priority Data
Oct. 8, 2003  (JP) ................ 2003-349089

(51) Int. Cl.
| | |
|---|---|
| H04N 21/84 | (2011.01) |
| H04N 21/426 | (2011.01) |
| H04N 7/173 | (2011.01) |
| H04N 21/2543 | (2011.01) |
| H04N 21/433 | (2011.01) |
| H04N 21/443 | (2011.01) |
| H04N 21/45 | (2011.01) |

(52) U.S. Cl.
CPC ... *H04N 21/42661* (2013.01); *H04N 7/17318* (2013.01); *H04N 21/2543* (2013.01); *H04N 21/4334* (2013.01); *H04N 21/443* (2013.01); *H04N 21/4532* (2013.01); *H04N 21/84* (2013.01)

(58) Field of Classification Search
USPC ............. 725/37–61, 9, 10, 14, 15, 109, 110
See application file for complete search history.

(56) References Cited

U.S. PATENT DOCUMENTS

| | | | | |
|---|---|---|---|---|
| 5,657,072 | A | | 8/1997 | Aristides et al. |
| 5,699,107 | A | * | 12/1997 | Lawler et al. .................. 725/58 |
| 5,758,257 | A | * | 5/1998 | Herz et al. ...................... 725/46 |
| 5,805,763 | A | * | 9/1998 | Lawler et al. .................. 725/40 |
| 5,914,746 | A | * | 6/1999 | Matthews et al. ............ 725/132 |
| 6,163,316 | A | * | 12/2000 | Killian .......................... 715/721 |

(Continued)

FOREIGN PATENT DOCUMENTS

| | | |
|---|---|---|
| EP | 1 215 593 A2 | 6/2002 |
| JP | 05-54466 | 3/1993 |

(Continued)

OTHER PUBLICATIONS

Office Action dated Dec. 16, 2016, in European Patent Application No. 04 023 816.4.

(Continued)

*Primary Examiner* — Kieu Oanh T Bui
(74) *Attorney, Agent, or Firm* — Oblon, McClelland, Maier & Neustadt, L.L.P.

(57) ABSTRACT

Disclosed is an information providing system for providing information on content recording. The system includes: a network communicating unit for communication via a network; and an information distributing unit for distributing the information on content recording via the network.

18 Claims, 7 Drawing Sheets

(56) References Cited

U.S. PATENT DOCUMENTS

| | | | |
|---|---|---|---|
| 6,772,433 B1* | 8/2004 | LaJoie et al. | 725/52 |
| 6,857,129 B2* | 2/2005 | Rogson et al. | 725/58 |
| 7,356,246 B1* | 4/2008 | Kobb | 386/83 |
| 2002/0046407 A1* | 4/2002 | Franco | 725/110 |
| 2002/0053090 A1* | 5/2002 | Okayama | H04N 21/42684 725/152 |
| 2002/0054068 A1* | 5/2002 | Ellis et al. | 725/153 |
| 2002/0133827 A1 | 9/2002 | Newnam et al. | |
| 2002/0135698 A1* | 9/2002 | Shinohara | 725/50 |
| 2003/0020744 A1* | 1/2003 | Ellis et al. | 345/723 |
| 2003/0036974 A1 | 2/2003 | Allen | |
| 2003/0149988 A1* | 8/2003 | Ellis et al. | 725/87 |
| 2003/0159151 A1* | 8/2003 | Ikeda | 725/58 |
| 2003/0208762 A1* | 11/2003 | Hanai et al. | 725/58 |
| 2004/0025174 A1* | 2/2004 | Cerrato | 725/9 |
| 2004/0078817 A1* | 4/2004 | Horowitz et al. | 725/58 |
| 2004/0205810 A1* | 10/2004 | Matheny et al. | 725/23 |
| 2004/0221308 A1* | 11/2004 | Cuttner et al. | 725/46 |
| 2004/0261126 A1* | 12/2004 | Addington | H04N 21/2543 725/135 |
| 2005/0028206 A1* | 2/2005 | Cameron et al. | 725/110 |
| 2005/0028208 A1* | 2/2005 | Ellis et al. | 725/109 |
| 2005/0076092 A1* | 4/2005 | Chang et al. | 709/217 |
| 2005/0086696 A1* | 4/2005 | Daniels | 725/88 |
| 2005/0120373 A1* | 6/2005 | Thomas et al. | 725/58 |
| 2005/0138672 A1* | 6/2005 | Stone | 725/134 |
| 2007/0094689 A1* | 4/2007 | McElhatten et al. | 725/58 |
| 2007/0094690 A1* | 4/2007 | Rodriguez et al. | 725/58 |

FOREIGN PATENT DOCUMENTS

| | | |
|---|---|---|
| JP | 05-54466 A | 3/1993 |
| JP | 10-336533 | 12/1998 |
| JP | 2001346231 | 12/2001 |
| JP | 2002-051287 | 2/2002 |
| JP | 2002-218363 | 8/2002 |
| JP | 2002-262202 | 9/2002 |
| JP | 2003209759 | 7/2003 |
| WO | WO 96/17467 | 6/1996 |

OTHER PUBLICATIONS

Chinese Notification of Reexamination dated Feb. 18, 2011 in Patent Application No. 200410090313.7 (with English Translation).
Chinese Office Action dated Aug. 21, 2009 in Patent Application No. 200410090313.7 (with Partial English Translation).
Chinese Notification of Nonacceptance of Amendments dated Mar. 27, 2009 in Patent Application No. 200410090313.7 (with English Translation).
Chinese Office Action dated Aug. 8, 2008 in Patent Application No. 200410090313.7 (with Partial English Translation).
Chinese Office Action dated Dec. 8, 2006 in Patent Application No. 200410090313.7 (with English Translation).
Chinese Office Action dated May 29, 2012 in Patent Application No. 200419090313.7 (without English Translation).
Chinese Reexamination Decision dated Apr. 26, 2011 in Patent Application No. 200410090313.7 (with Partial English Translation).

* cited by examiner

INFORMATION PROVIDING SYSTEM AND INFORMATION PROVIDING METHOD, CONTENT RECORDING APPARATUS AND CONTENT RECORDING METHOD, AND COMPUTER PROGRAM

BACKGROUND OF THE INVENTION

The present invention relates to an information providing system and an information providing method, a content recording apparatus and a content recording method, and a computer program that provide predetermined information to a user to view contents. The invention particularly relates to an information providing system and an information providing method, a content recording apparatus and a content recording method, and a computer program that provide information about programmed recording of a content to a user to view recorded contents.

More specifically, the present invention relates to an information providing system and an information providing method, a content recording apparatus and a content recording method, and a computer program that provide information about programmed recording of a content by initiative of a content distributor side. The invention particularly relates to an information providing system and an information providing method, a content recording apparatus and a content recording method, and a computer program that provide information for setting and changing programmed recording of a content by initiative of a content distributor side.

Broadcasting plays an immense role in civilized modern information society. Television broadcasting, in particular, which directly delivers sound and video information to viewers, has a great influence. Broadcasting technology includes a wide variety of techniques, such as signal processing, transmission and reception of signals, audio and video information processing, and the like. Further, there are various transmission forms (modalities) for providing program contents to users, such as broadcasting systems using radio waves such as satellite waves, terrestrial waves and the like, cable television systems, and net programs provided by using computer communication.

A dissemination rate of television is very high, with television sets installed in almost all households. Broadcast contents distributed from each broadcasting station are viewed by an indefinite number of the general public. In another mode of viewing broadcast contents, received contents are recorded on a viewer side and then reproduced at a desired time.

Recent development of digital technology has been making it possible to store a large amount of AV data including video and audio. For example, with HDDs (Hard Disk Drives) having a capacity of a few ten GB or more available at relatively low prices, HDD-based recorders, personal computers (PCs) having functions for recording and viewing television programs, and the like are appearing.

The HDD is a device capable of random access to recorded data. Hence, in reproducing recorded contents, unlike a case of conventional video tape, it is not necessary to simply reproduce a recorded program sequentially from a start; it is possible to directly start reproducing a desired program (or a specific scene or a specific segment in a program).

A system in which a receiver (a television or a video recording and reproducing apparatus) including a large-capacity storage such as a hard disk device, a DVD (Digital Versatile Disc) recorder and the like is used to receive broadcast contents, and the broadcast contents are stored in the receiver and then reproduced is referred to as a "server type broadcast system." The server type broadcast system enables not only real-time viewing as in ordinary television reception, but also viewing from a specified time after video and audio are transmitted in advance, and scene retrieval and digest viewing using simultaneously transmitted information and the like.

When a large number of programs are stored in a system capable of recording programs for as long as a few ten hours, such as an HDD recorder, a DVD recorder or the like, a user is puzzled over selection of program contents, or as to which program to view first or which program to record. Some assistance for viewing is considered necessary to prevent contents stored with effort from being left unused and utilize the contents effectively. Partly for this reason, effective operation of programmed recording of broadcast programs is considered important for users to have beneficial television program viewing activity.

A so-called electronic program guide (EPG) system, for example, is known in which a program guide for selecting television broadcast programs is superimposed on an image signal to be transmitted, and the program guide is displayed on a display device on a receiver side. Obtaining an EPG in parallel with viewing of a broadcast program, a user can identify or estimate programs desired to be viewed by referring to the EPG distributed as an accompaniment to the program.

As another method for recommending program recording, a user looks at a bulletin board on a network, and manually performs recording operation according to contents described on the bulletin board.

However, in the conventional mode of program recording on the basis of program information including the EPG and the like, program recording is generally performed under initiative of users. In other words, conditions and convenience of a content distributor side are not reflected in program recording operation. For example, when the content distributor side changes a time for recording, programmed recording cannot be changed automatically. In addition, programmed recording of a same program for a next week, for example, cannot be set automatically.

SUMMARY OF THE INVENTION

It is an object of the present invention to provide an information providing system and an information providing method, a content recording apparatus and a content recording method, and a computer program that are excellent for providing information about programmed recording of a content to a user to view recorded contents.

It is another object of the present invention to provide an information providing system and an information providing method, a content recording apparatus and a content recording method, and a computer program that are excellent for providing information about programmed recording of a content by initiative of a content distributor side.

It is a further object of the present invention to provide an information providing system and an information providing method, a content recording apparatus and a content recording method, and a computer program that are excellent for providing information for setting and changing programmed recording of a content by initiative of a content distributor side.

The present invention has been made in view of the above problems. According to the first aspect of the present invention, there is provided an information providing system for providing information on content recording, the information providing system including:

a network communicating unit for communication via a network; and an information distributing unit for distributing the information on content recording via the network.

According to the second aspect of the present invention, there is provided an information providing method for providing information on content recording, the information providing method including:

a network communicating step for communication via a network; and an information distributing step for distributing the information on content recording via the network.

According to the third aspect of the present invention, there is provided a content recording apparatus for performing a content recording process on a basis of information on content recording, the content recording apparatus including:

a content receiving unit for receiving a content;

a content storing unit for recording the content;

a network communicating unit for communication via a network;

an information downloading unit for downloading the information on content recording from a server on the network;

a downloaded information analyzing unit for analyzing the information downloaded from the server; and a recording control unit for controlling one of a received content recording process and a received content recording programming process on a basis of a result of analysis of the downloaded information.

According to the fourth aspect of the present invention, there is provided a content recording method for performing a content recording process on a basis of information on content recording, the content recording method including:

an information downloading step for downloading the information on content recording from a server on a network;

a downloaded information analyzing step for analyzing the information downloaded from the server; and a recording control step for controlling one of a content recording process and a content recording programming process on a basis of a result of analysis of the downloaded information.

According to the fifth aspect of the present invention, there is provided a computer program described in a computer readable form so as to perform a content recording process on a computer system on a basis of information on content recording, the computer program including:

an information downloading step for downloading the information on content recording from a server on a network;

a downloaded information analyzing step for analyzing the information downloaded from the server; and a recording control step for controlling one of a content recording process and a content recording programming process on a basis of a result of analysis of the downloaded information.

The "system" in this case refers to a logical combination of a plurality of apparatus (or function modules realizing specific functions), and the apparatus or the function modules are not particularly required to be within a single enclosure.

The information on content recording in this case refers to an application for performing a process of automatic content recording or a predetermined data file describing information on automatic content recording.

The content recording apparatus according to the present invention downloads the automatic programmed recording application from the server via the network, sets programmed recording on the basis of information retained internally, and downloads external recording data for programmed recording.

When provision is made on the server side that provides the automatic programmed recording application, programmed recording is automatically changed in a case where a recording time is changed, or programmed recording of the same program to be broadcast next week is automatically performed. A content holder such as a content producer, a television station or the like can create the automatic programmed recording application.

Such a system has an advantage in that a producer of a program desired to be viewed by a larger audience or a television station can take the initiative to freely handle programmed recording setting in various manners. For example, in a case of change in programming or a special program, the program is automatically recorded for viewing by users, so that opportunities of the program being viewed can be increased.

According to the present invention, it is possible to provide an information providing system and an information providing method, a content recording apparatus and a content recording method, and a computer program that are excellent for providing information about programmed recording of a content by initiative of a content distributor side.

According to the present invention, it is possible to provide an information providing system and an information providing method, a content recording apparatus and a content recording method, and a computer program that are excellent for providing information for setting and changing programmed recording of a content by initiative of a content distributor side.

According to the present invention, a content producer side can create settings of programmed recording for users freely to a certain extent. For example, when the content distributor side changes a time for recording, programmed recording can be changed automatically. In addition, programmed recording of a same program for a next week, for example, can be set automatically.

According to the present invention, a business model can be constructed which lends a site to a content producer or a television station. Specifically, it is possible to charge on the basis of periods of time, or charge content holders when information is obtained on the site or contents recorded by programmed recording are viewed.

In addition, according to the present invention, when automatic programmed recording is performed manually by a content distributor side, an advertisement can be recorded together with a main part of a content for viewing. It is thus possible to create a new business model related to advertisement costs.

Further, information about automatic programmed recording according to the present invention can be distributed as an application in a form of push or pull information. It is therefore possible to develop unconventional unique service.

Other and further objects, features, and advantages of the present invention will become apparent from more detailed description in the following of embodiments of the present invention with reference to the accompanying drawings.

DETAILED DESCRIPTION OF THE PREFERRED EMBODIMENTS

A preferred embodiment of the present invention will hereinafter be described in detail with reference to the drawings.

Figure 1:
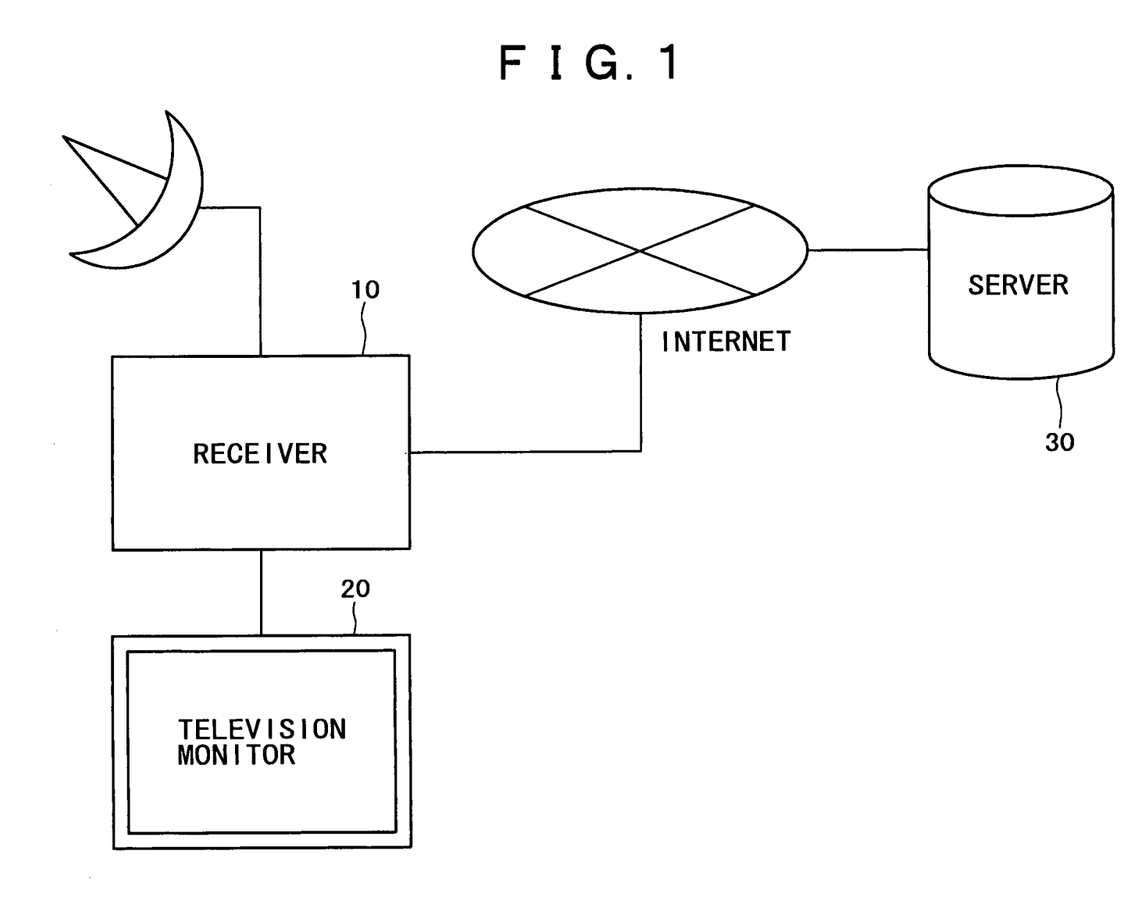
FIG. 1 is a schematic diagram showing a configuration of an information providing system according to an embodiment of the present invention.

An information providing system according to the present invention can provide information for setting programmed recording and changing programmed recording by initiative of a content distributor side. FIG. 1 schematically shows a configuration of an information providing system according to an embodiment of the present invention.

The information providing system shown in FIG. 1 includes: a television receiver 10 proper for receiving, recording, and reproducing contents; a television monitor 20 connected to the television receiver 10, for outputting contents; and a server 30 for providing the television receiver 10 with information for setting programmed recording of contents and changing programmed recording of contents.

The television receiver 10 proper has a down link including an antenna for receiving broadcast radio waves including satellite waves or terrestrial waves, and the like, and a down link for obtaining information via a wide area network such as the Internet or the like.

A plurality of servers are installed on the Internet. At least one of the servers updates information within the television receiver 10 proper, downloads information of the server to the television receiver 10, and downloads (to be described later) an application (to be described later).

Figure 2:
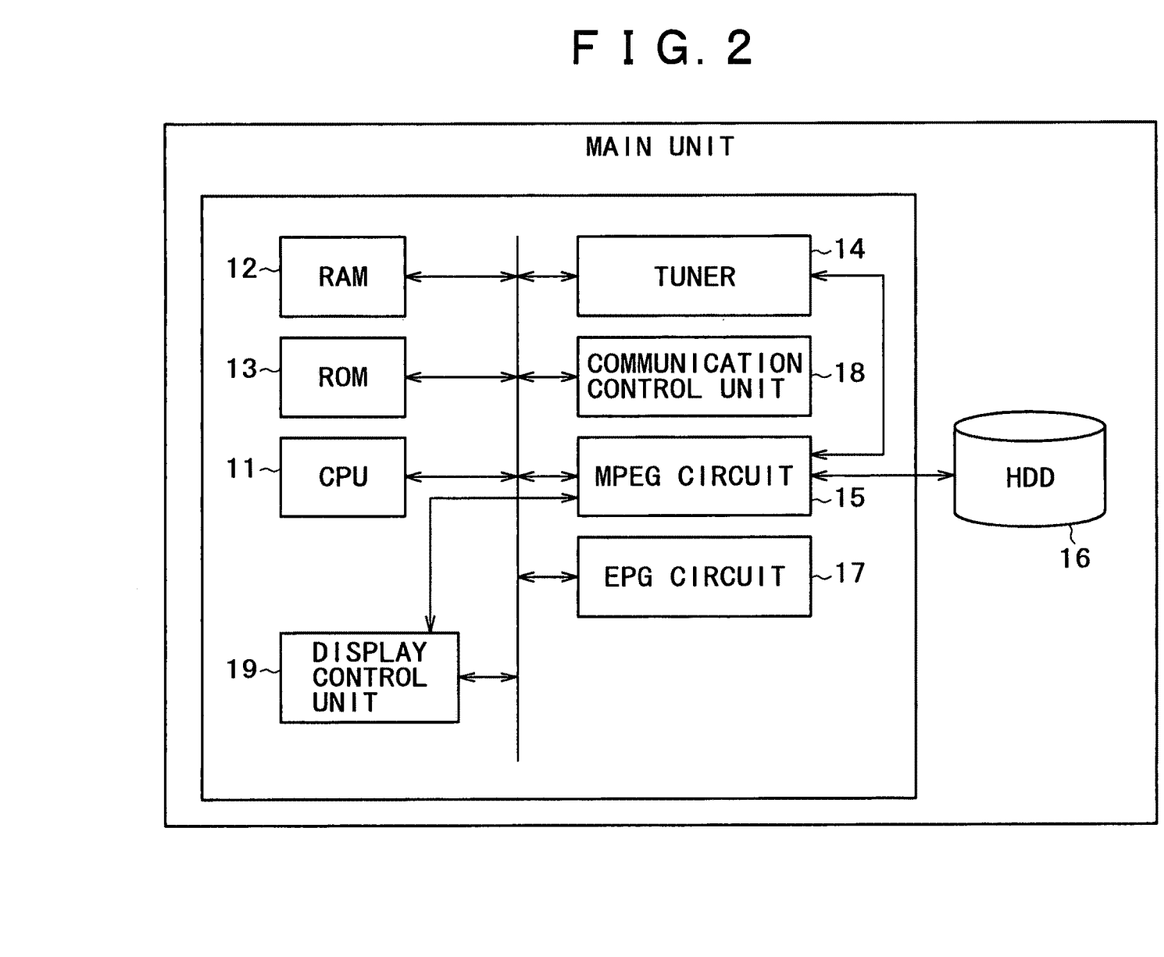
FIG. 2 is a schematic diagram showing a configuration of hardware within a television receiver proper.

FIG. 2 schematically shows a configuration of hardware within the television receiver 10 proper.

A CPU (Central Processing Unit) 11 executes a given application under an executing environment provided by an operating system, and thereby effects centralized control of operation with the apparatus.

A RAM (Random Access Memory) 12 is a readable and writable memory device. The RAM 12 is used to load a program to be executed by the CPU 11, and temporarily store work data during the execution. A ROM (Read Only Memory) 13 is a read-only memory device. The ROM 13 is used to permanently store code of a program to be executed by the CPU 11, for example.

A tuner 14 selects a broadcast content received by the antenna (described above) according to a user input or an instruction from an automatic recording application (to be described later), for example.

An MPEG circuit 15 performs an encoding process and a decoding process in an MPEG (Moving Picture Experts Group) format of audio and video data.

A hard disk device (HDD) 16 is a large-capacity storage device of a magnetic recording type. The hard disk device 16 is used to install applications and other programs and store files on a nonvolatile basis. In the present embodiment, the HDD 16 is also used as a medium for storing program contents according to programmed recording settings. However, the storage medium of the present invention is not limited to the HDD; the storage medium may be replaced with another medium capable of recording and reproducing contents.

Program contents are generally stored in the HDD 16 in a state of being encoded in the MPEG format. In a case of digital broadcast, broadcast contents received according to automatic programmed recording settings are stored in the HDD 16 as they are. In a case of analog broadcast, broadcast contents are encoded by the MPEG circuit 15 and then stored in the HDD 16. In reproducing recorded and stored contents, corresponding audio and video data is read from the HDD 16, decoded by the MPEG circuit 15, and then outputted to the television monitor 20.

An EPG circuit 17 analyzes an EPG (Electronic Program Guide) received as an accompaniment to a main part of a broadcast content. A result of the analysis is stored in the HDD 16, for example.

A communication control unit 18 is connected to the Internet according to a predetermined communication protocol such as TCP/IP or the like, and controls operation of downloading information and programs from the server.

A display control unit 19 controls screen display operation when outputting a broadcast content on the air or a program content read from the HDD 16 and decoded to the screen of the television monitor 20. The display control unit 19 also superimposes an EPG user interface to be outputted for display, for example.

The CPU 11 within the television receiver 10 proper according to the present embodiment executes a given application under an executing environment provided by the operating system. Applications and other executing programs are installed on the HDD 16 (described above). When the CPU 11 executes an automatic programmed recording application, for example, programmed recording of program contents in accordance with a predetermined procedure is realized.

Figure 3:
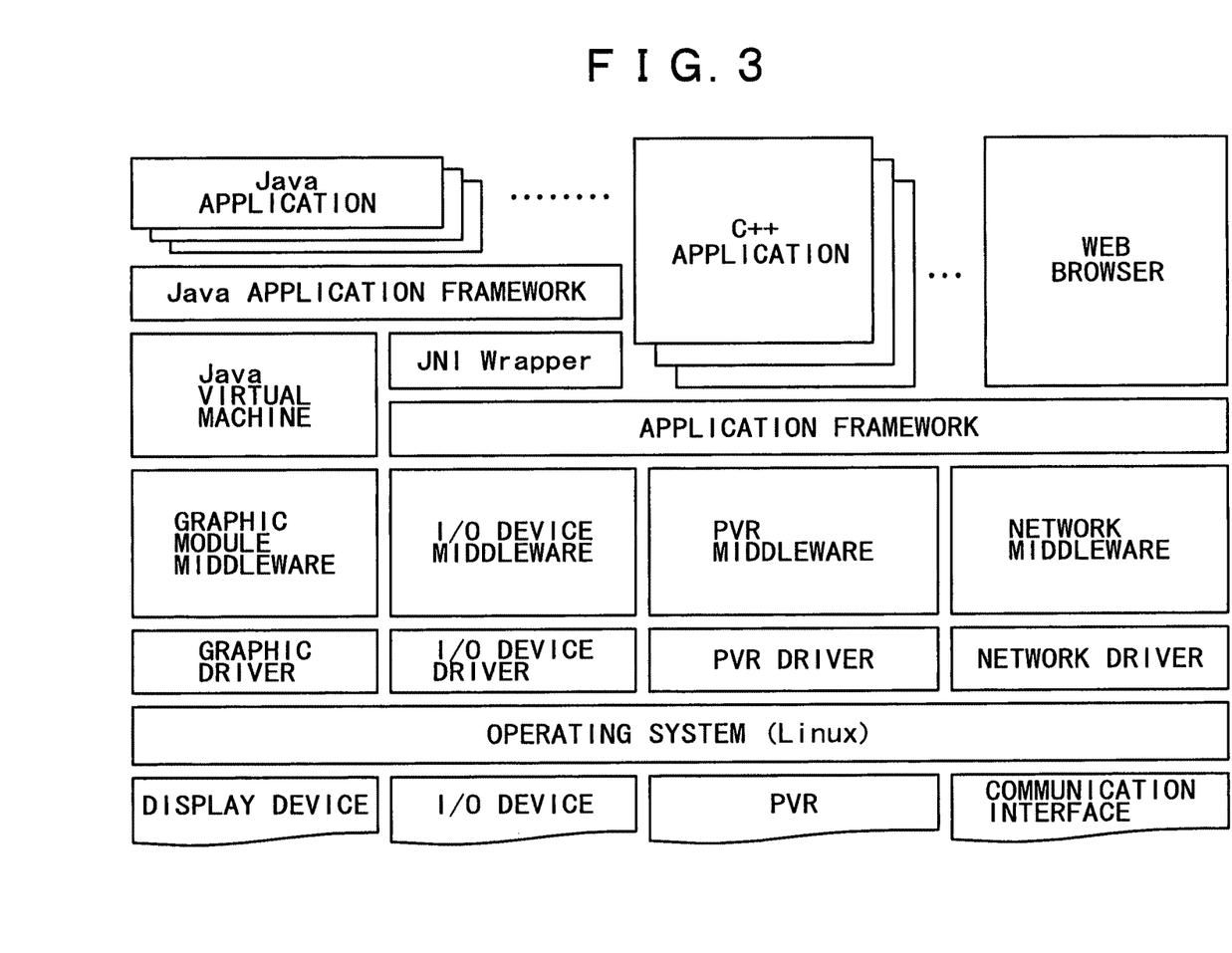
FIG. 3 is a schematic diagram showing a configuration of software for automatic programmed recording in the television receiver proper.

FIG. 3 schematically shows a configuration of software for automatic programmed recording in the television receiver 10 proper.

As shown in FIG. 3, a software group operates under an executing environment provided by a UNIX (registered trademark) based operating system such as Linux. The software group hierarchically includes a device driver layer, a middleware layer, and an application layer.

Device drivers and middleware are provided so as to correspond to respective hardware components composing the television receiver 10. Included in the example of FIG. 3 are a graphic driver and graphic module middleware for handling display output to the television monitor 20, a PVR driver and PVR middleware for handling processes of recording and reproducing contents on the HDD, a network driver and network middleware for handling network operation by the communication control unit 18, and an I/O driver and I/O device module middleware for handling operations of input and output to and from other hardware components.

General applications and Java applications described in a Java language can operate on a platform including the operating system and the driver/middleware group.

C++ applications described in a general-purpose programming language such as C++, a Web browser and the like operate on a general application framework.

Java applications operate on a Java Virtual Machine that abstracts the lower software layer or a JNI (Java Native Interface) Wrapper handling a native method, and a Java application framework.

An automatic programmed recording application according to the present embodiment (to be described later) is implemented as a Java application, for example.

At least one of the servers on the Internet updates information within the television receiver 10 proper, downloads information of the server to the television receiver 10, and downloads an application (described above). The application in this case includes the automatic programmed recording application that controls operation of automatic programmed recording of program contents on the television receiver 10.

Figure 4:
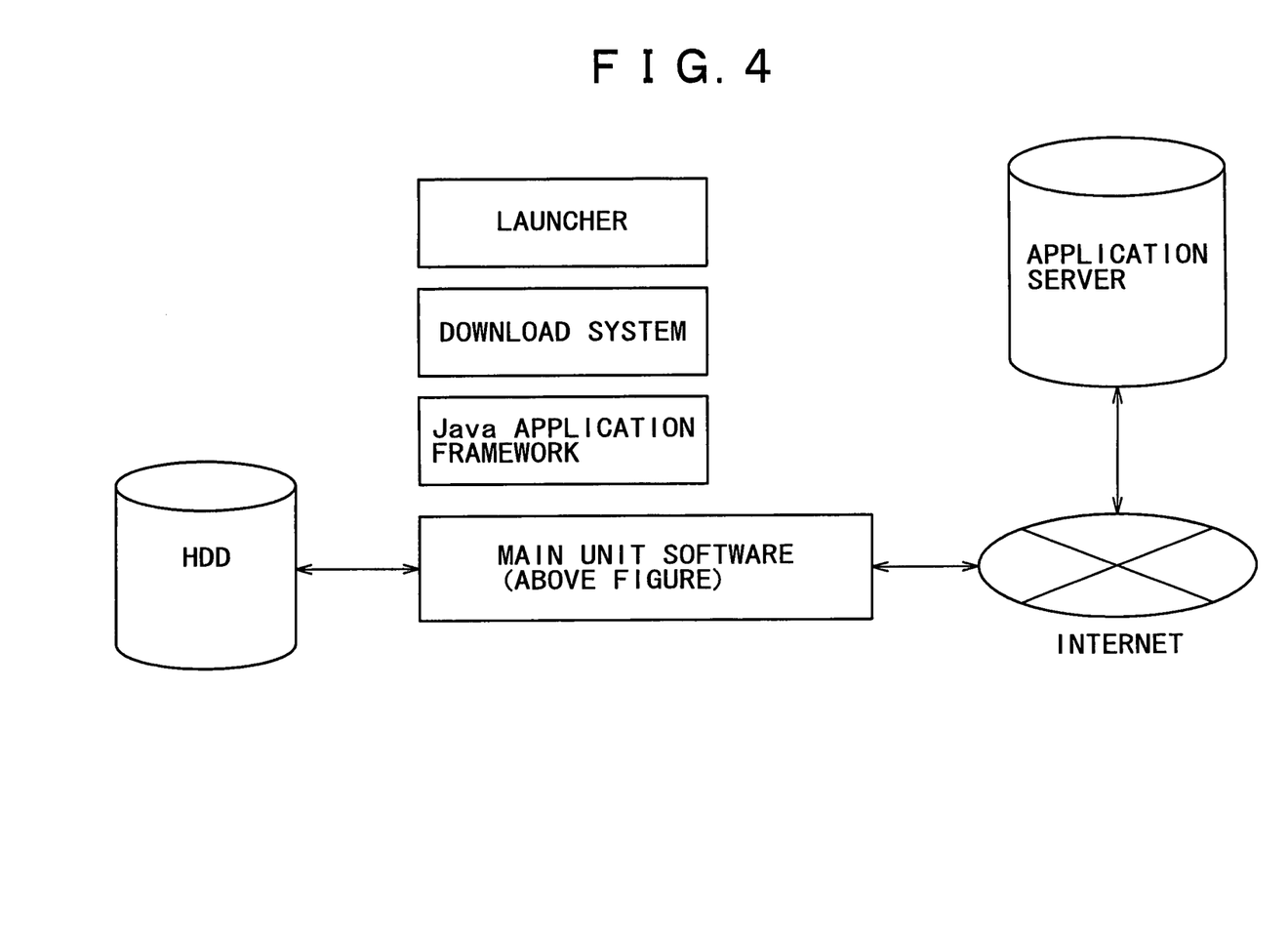
FIG. 4 is a diagram showing a platform for downloading an application with a download system implemented on Java.

FIG. 4 shows a platform for downloading the application with a download system implemented on Java for the television receiver 10 having the software configuration as shown in FIG. 3.

As shown in FIG. 4, the download system and a launcher are incorporated on the Java application framework. In this case, a system for downloading the application from the application server via the Internet, and storing the application on the HDD 16 is assumed.

The application server provides the automatic programmed recording application for automatic programmed recording of broadcast programs on the television receiver 10 side, or an XML (extended Markup Language) data file describing information on programmed recording.

Further, the application server is provided with a function module having a content automatic recording selecting page and update information provided by a television station, a content producer, a "Come on! My Caster" site (Web site that enables programmed recording via the Internet, and offers software upgrades and the like) operator, or the like.

The download system has the following functions, and downloads the application or the XML data file in the application server.

(1) Downloading and analyzing information on the downloadable application present in the application server (2) Storing the downloaded application on the HDD 16

(3) Deleting the downloaded application stored on the HDD 16 from the HDD 16

(4) Loading a class file when the downloaded application is started

The launcher has the following functions, and checks whether update information is updated by accessing the application server periodically, or a push function.

(1) Displaying applications that can be started on the screen (2) Displaying applications downloadable from the application server (3) Starting and ending an application The Java application framework calls functions of the Java VM and the software of the television receiver 10 proper, and has functions called from the functions of the television receiver 10 proper, an abnormality detecting function, and the like.

In the present embodiment, these functions are used to construct a mechanism that enables the television receiver 10 to download an application from the application server and execute the application.

Description will next be made of a process procedure for downloading an application from the application server to the television receiver 10.

Figure 5:
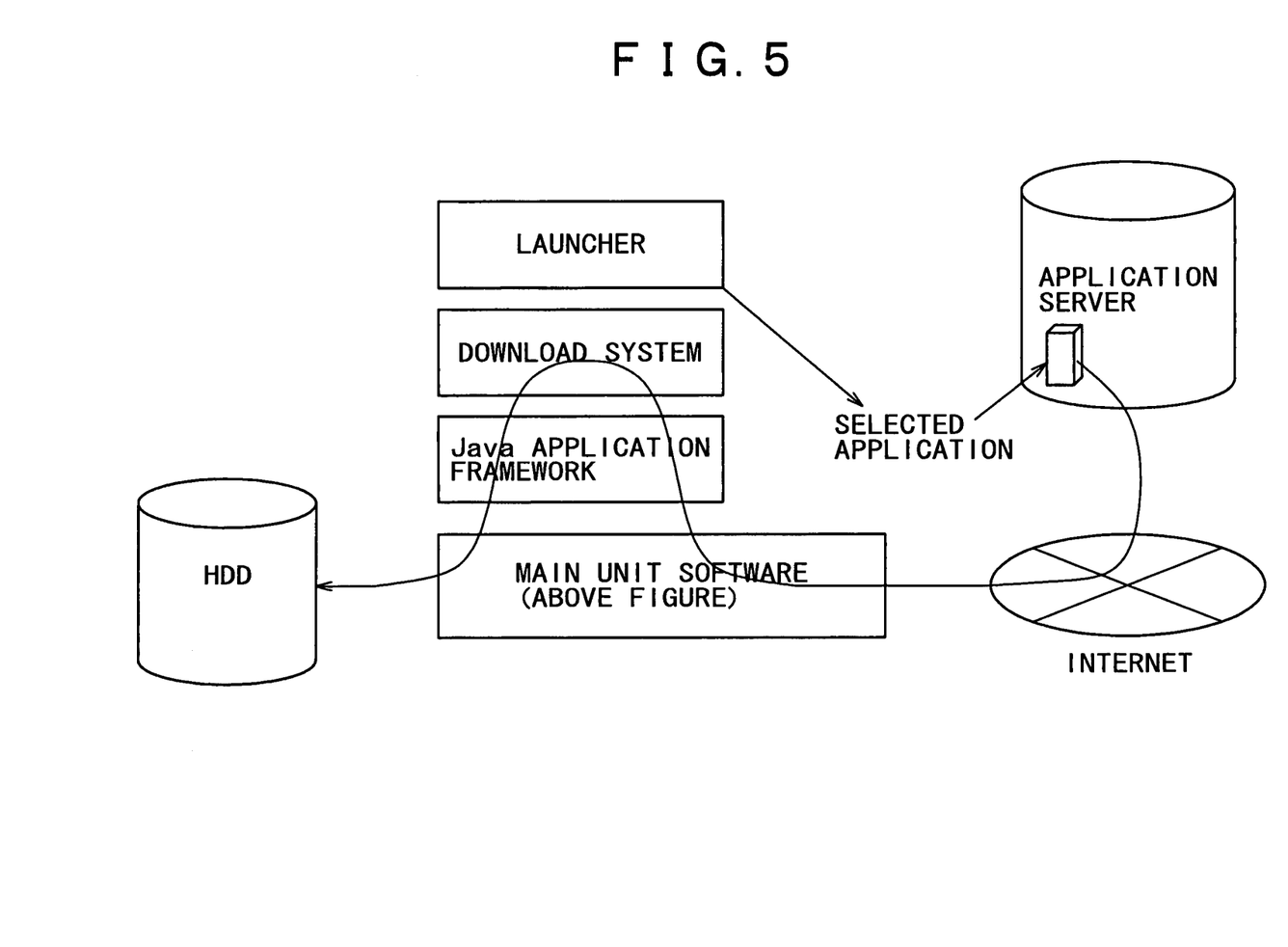
FIG. 5 is a diagram illustrating a process flow for downloading an application.

FIG. 5 illustrates a process flow for downloading an application. When a user selects an application using the launcher, the download system performs a pre-download process such as authentication or the like. When succeeding in the authentication, the download system downloads the application from the application server to the HDD via the Internet.

Description will next be made of a process procedure for downloading the automatic programmed recording application from the application server to the television receiver 10.

Rather than specifying the application from the launcher as described above, it is made possible to specify a television station, a content producer, a genre, or the like. Further, the application server is allowed to specify as described above rather than specifying the application. Thus, when an application related to a television station, a content provider, or a genre is prepared, the application is automatically downloaded and started.

There are a few methods for realizing the download of the automatic programmed recording application. When the download is performed with the above-described launcher, the launcher accesses the application server periodically. Then, when applications related to a selection are increased, the application server returns a status. In response to this, the launcher can download and execute the related applications.

In a case of programmed recording information alone, a method is possible which downloads the programmed recording information as data such as an XML rather than as an application to set programmed recording.

Description will next be made of a method for automatic recording of a specified program.

For users to view a program, a television station, a content producer or the like develops an automatic recording Java application that performs programmed recording, or prepares an XML file by combining a recording time, a channel, and a date into each piece of data of local stations. The application or the file is stored in the application server in a state of being able to be supplied. Then, when a user specifies the television station or the content, the launcher automatically recognizes an update, and the application is downloaded or the XML data file is downloaded to automatically record the specified program.

Such a system has an advantage in that a producer of a program desired to be viewed by a larger audience or a television station can take the initiative to freely handle programmed recording setting in various manners. For example, in a case of change in programming or a special program, the program is automatically recorded for viewing by users, so that opportunities of the program being viewed can be increased.

Figure 6:
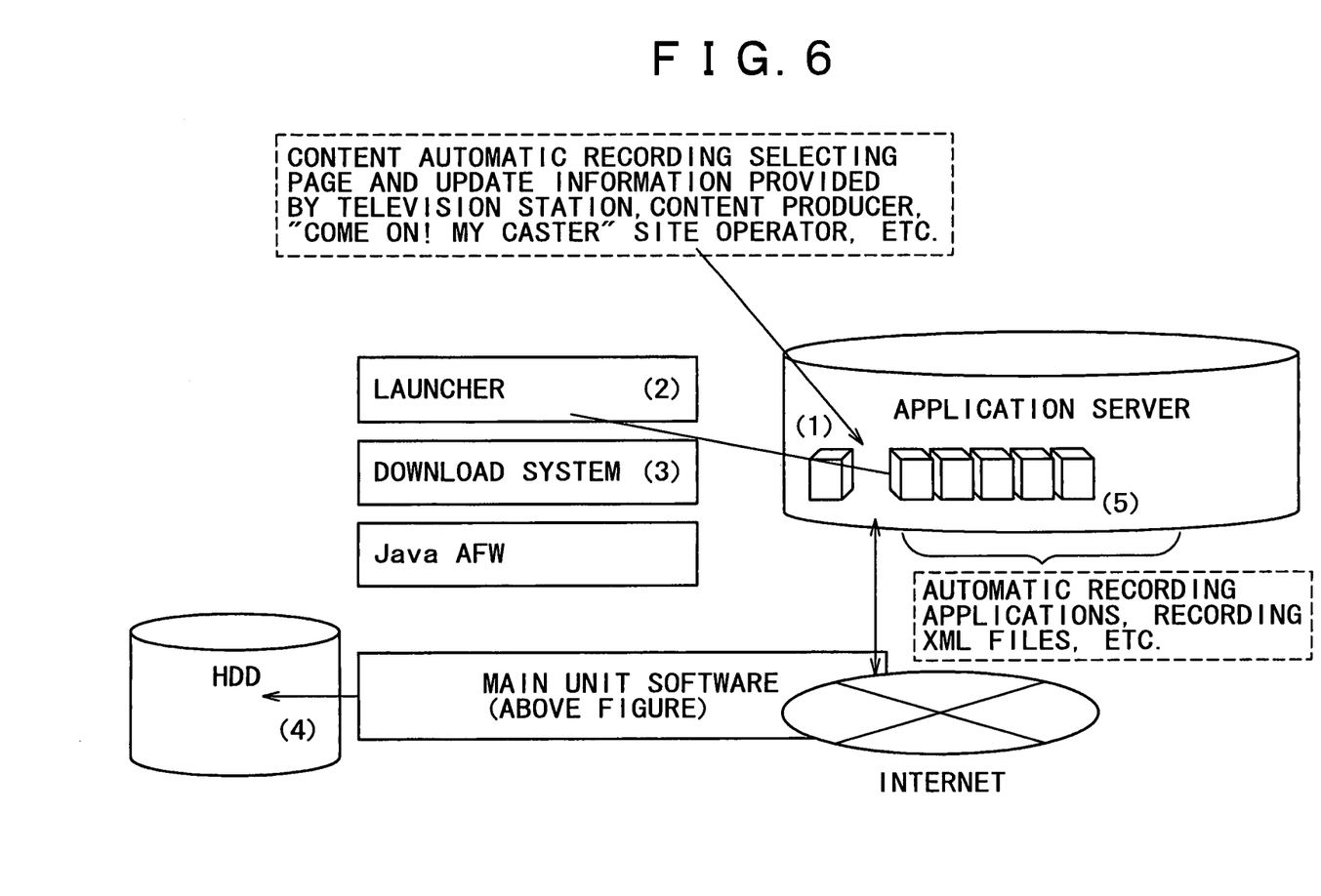
FIG. 6 is a diagram showing an example of functional extensions of automatic recording applications.

When information on automatic recording is downloaded in the form of an application, the following extensions are freely made (see FIG. 6).

(1) Information on whether a user actually viewed a program content recorded by automatic programmed recording can be later returned to the application server side. Further, the information can be provided as data to the television station, the content provider, or the like.

(2) Since the viewing by the user of the content recorded by automatic programmed recording is known, it is possible to capture recording schedule data of a program for a next week and perform another automatic programmed recording. When recording information of an entire schedule is embedded in the application in advance, automatic programmed recording can be performed without downloads. Supposing that the schedule is changed due to special programs or the like, however, it is considered that inquiring of the application server is still necessary.

(3) Since users are allowed to perform recording, a business model can be constructed in which when it is determined that the users viewed a program content, a corresponding cashback in return therefor is requested from the television station, the content provider, or the like. Alternatively, presents can be given to viewers according to their viewing histories, for example.

Such extensions can be realized as so-called agent functions.

In FIG. 6, reference numeral (1) corresponds to a function module having an authentication function, an automatic recording selecting page, and update information. Reference numeral (2) represents a function module that checks whether update information is updated by accessing (1) periodically, or a push function. Reference numeral (3) represents a function module that downloads an application or an XML data file in the application server. Reference numeral (4) represents an area for storing the downloaded application or data. Reference numeral (5) represents an area for storing automatic recording applications and recording data files.

Figure 7:
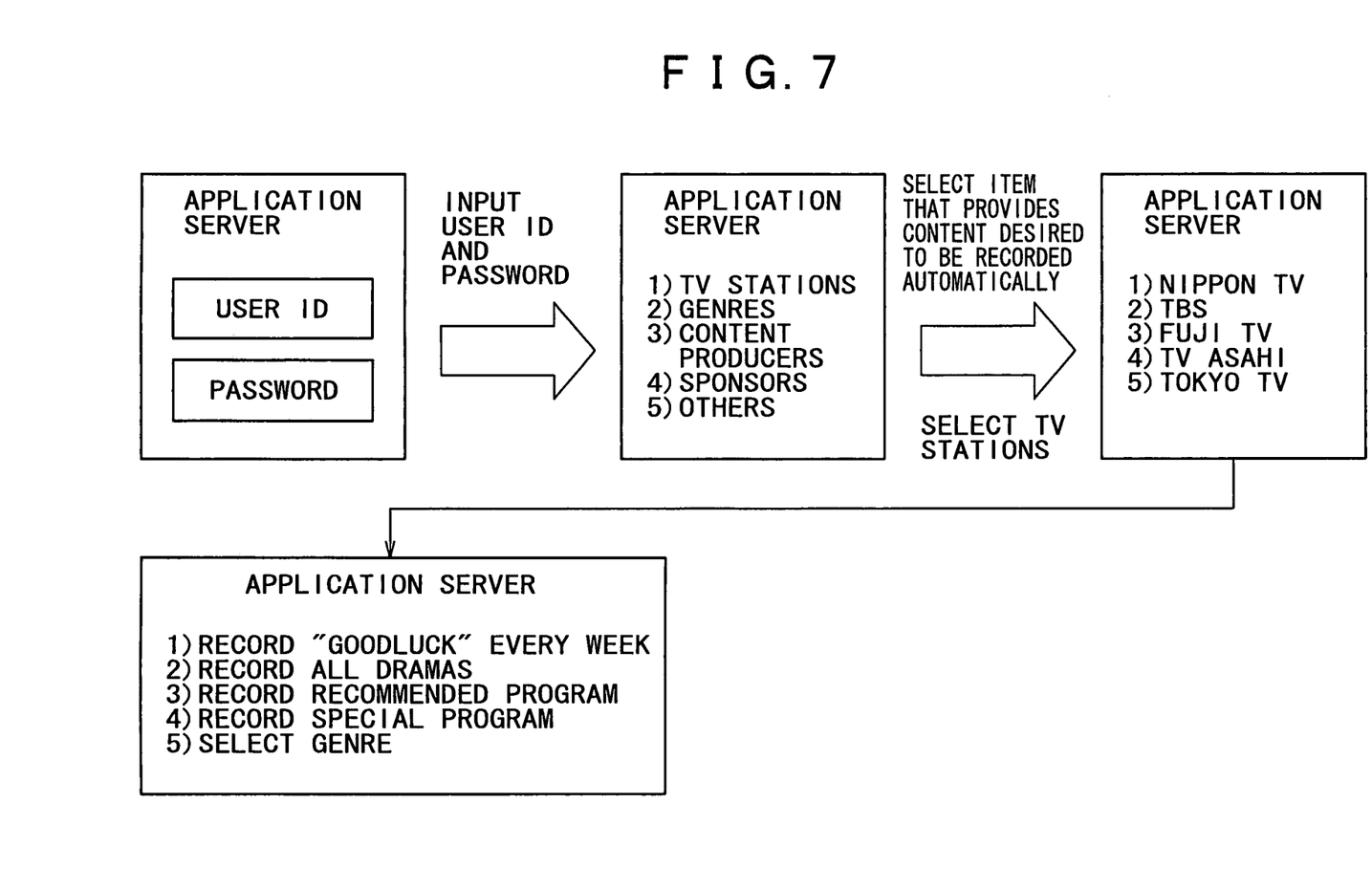
FIG. 7 is a diagram showing a procedure for application download operation via a user interface.

In addition, it is possible to operate the application server from the television receiver 10 via a user interface on the television monitor 20. FIG. 7 shows a procedure for application download operation via the user interface.

A screen for connection to the application server which screen prompts a user to input a user ID and a password is shown on the screen of the television monitor 20 connected to the television receiver 10.

When verification of the user ID and the password and a subsequent authentication process are successfully performed, the user is allowed to log in to the application server, and then proceeds to an application selecting screen.

The user selects a menu of a desired site that provides a content desired to be recorded automatically. When selecting television stations, for example, the user proceeds to a next screen having a menu of television stations.

When further selecting a specific television station, options for automatically recording programs provided by the television station are displayed. Various uses are available, such as recording of all of specified programs, recording of a program recommended by the television station, and selection of a program to be recorded automatically after selecting a genre, for example. Contents selected by the user can be set to be recorded automatically.

Finally, description will be made of a method for checking whether a user viewed a program content automatically recorded on the television receiver 10.

Each program recorded by programmed recording is made to have a status, and a monitoring application is started. This monitoring application changes the status of the content to "viewed" when the content is viewed for a certain time or to an end.

To realize a function for cashback in return for viewing, a function of sending a notification from the application side to the application server side is included in the monitoring application. This monitoring function can be implemented as a Java application together with a programmed recording function.

The present invention has been explained above in detail with reference to a specific embodiment. However, it is obvious that those skilled in the art can make modifications of the embodiment and substitutions without departing from the spirit of the present invention. That is, the present invention has been disclosed in a form that is illustrative, and contents described in the present specification are not to be construed as restrictive. To determine the spirit of the present invention, a section of claims described at the beginning hereof is to be considered.

What is claimed is:

1. A method for an information processing apparatus, the method comprising:
    selecting a content provider, from a content provider list, for which an application is to be downloaded, the application stores content from the selected content provider in a storage medium on the information processing apparatus;
    downloading, in response to the selection of the content provider from the content provider list, the application corresponding to the selected content provider among plural applications corresponding to different content providers;
    checking for an updated application that stores the content from the selected content provider in the storage medium on the information processing apparatus;
    downloading the updated application when the updated application is available;
    executing the updated application to store the content from the selected content provider in the storage medium on the information processing apparatus;
    determining whether the content has been reproduced on a display connected to the information processing apparatus;
    transmitting a viewing status of the content identifying whether the content has been reproduced, in order to generate user compensation, wherein
    the updated application obtains and stores commercial content in addition to the content.

2. The method according to claim 1, wherein the different content providers at least correspond to different television stations.

3. The method according to claim 1, wherein the information processing apparatus is a set-top box.

4. The method according to claim 1, wherein the viewing status of the content is transmitted to an application server via a network.

5. The method according to claim 1, wherein the updated application includes information relating to a broadcast schedule change with respect to the content.

6. The method according to claim 1, wherein the content from the selected content provider is television programming.

7. The method according to claim 1, wherein the application is an automatic programmed recording application.

8. The method according to claim 1, wherein the application includes a recording schedule for the content.

9. An information processing apparatus comprising:
    circuitry configured to:
    select a content provider, from a content provider list, for which an application is to be downloaded, the application when executed stores content from the selected content provider in a storage medium on the information processing apparatus;
    download, in response to the selection of the content provider from the content provider list, the application corresponding to the selected content provider among plural applications corresponding to different content providers;

check for an updated application that stores the content from the selected content provider in the storage medium on the information processing apparatus;

download the updated application when the updated application is available;

execute the updated application to store the content from the selected content provider in the storage medium on the information processing apparatus;

determine whether the content has been reproduced on a display connected to the information processing apparatus;

transmit a viewing status of the content identifying whether the content has been reproduced, in order to generate user compensation, wherein the updated application obtains and stores commercial content in addition to the content.

10. The information processing apparatus according to claim 9, wherein the different content providers at least correspond to different television stations.

11. The information processing apparatus according to claim 9, wherein the information processing apparatus is a set-top box.

12. The information processing apparatus according to claim 9, wherein the viewing status of the content is transmitted to an application server via a network.

13. The information processing apparatus according to claim 9, wherein the updated application includes information relating to a broadcast schedule change with respect to the content.

14. A non-transitory computer readable medium having a computer program recorded thereon, the computer program configured to perform a method when executed on an information processing apparatus, the method comprising:

selecting a content provider, from a content provider list, for which an application is to be downloaded, the application stores content from the selected content provider in the information processing apparatus;

downloading, in response to the selection of the content provider from the content provider list, the application corresponding to the selected content provider among plural applications corresponding to different content providers;

checking for an updated application that stores the content from the selected content provider in the information processing apparatus;

downloading the updated application when the updated application is available;

executing the updated application to store the content from the selected content provider in the information processing apparatus;

determining whether the content has been reproduced on a display connected to the information processing apparatus;

transmitting a viewing status of the content identifying whether the content has been reproduced, in order to generate user compensation, wherein the updated application obtains and stores commercial content in addition to the content.

15. The non-transitory computer readable medium according to claim 14, wherein the different content providers at least correspond to different television stations.

16. The non-transitory computer readable medium according to claim 14, wherein the information processing apparatus is a set-top box.

17. The non-transitory computer readable medium according to claim 14, wherein the viewing status of the content is transmitted to an application server via a network.

18. The non-transitory computer readable medium according to claim 14, wherein the updated application includes information relating to a broadcast schedule change with respect to the content.

* * * * *